Sept. 20, 1966 M. SILVERBERG 3,274,398

LOGIC CIRCUITS

Filed April 1, 1963 2 Sheets-Sheet 1

INVENTOR.
MORTON SILVERBERG
BY John V. Regan
Attorney

INVENTOR.
MORTON SILVERBERG
BY John V. Regan
Attorney

United States Patent Office 3,274,398
Patented Sept. 20, 1966

3,274,398

LOGIC CIRCUITS

Morton Silverberg, Riverton, N.J., assignor to Radio Corporation of America, a corporation of Delaware Filed Apr. 1, 1963, Ser. No. 269,500
14 Claims. (Cl. 307—88.5)

This invention relates to logic circuits and, in particular, to logic circuits which may employ high speed transistors.

The use of high speed transistors in logic circuits introduces problems which are generally not encountered when low speed transistors are used. The inherently sharp turn-on time and low control charge of some of the high speed transistors, the present silicon epitaxial transistors, for example, render the devices highly sensitive to noise. False triggering of a logic circuit involving the device may result unless steps are taken either to reduce the generated noise amplitude and/or to introduce some immunity to noise.

It generally has been the practice to neglect considering the input and output signal lines in the design of low speed logic circuits. When high speed transistors are employed, however, the signal lines interconnecting logic circuits should be considered in the circuit design. The fast rise and fall times of the transistor output cause reflections and even ringing in the output signal lines, which may cause false triggering of circuits driven from the lines unless the lines are properly terminated. These reflections also create noise on neighboring signal lines due to electrostatic and electromagnetic coupling. If the amplitude of the reflections is large enough, the noise may be sufficient to trigger circuits driven from the neighboring lines.

The aforementioned and other factors render many known logic circuits unreliable or otherwise unsuitable for use with high speed transistors. Great care must be exercised in the selection of both the logic circuitry and the interconnections between circuits if the aforementioned problems are to be avoided. In the event it is desired to construct the logic circuits in either integrated or semi-integrated form, additional circuit limitations are imposed by present integrated fabrication techniques.

Accordingly, it is one object of this invention to provide an improved logic circuit which is especially suitable for use with high speed transistors.

It is another object of the invention to provide high speed logic circuits in which ringing is prevented in the interconnecting signal lines and reflections are held to an amplitude that is insufficient to produce false triggering.

It is still another object of this invention to provide a logic circuit arrangement in which a signal line sees an apparent termination close to its characteristic impedance, although the line is not actually so terminated physically.

It is a further object of this invention to provide an improved logic circuit which lends itself to integration or semi-integration using small geometry silicon solid state devices.

Another object of the invention is to provide a logic circuit which has the features immediately aforementioned and which requires only one source of bias potential.

Another object of this invention is to provide a logic circuit whose voltage and current signal swings are reduced, thus reducing generated cross-talk noise while retaining excellent noise immunity under both high and low quiescent signal conditions.

All signal lines have an impedance that may be considered a characteristic impedance, determined largely by the line inductance and the proximity of the line to ground planes and other signal lines. It is desirable to reduce the total amount and number of signal lines as much as possible in order to reduce the effect on the characteristic impedance of the lines due to the proximity of neighboring lines, reduce cross-talk between neighboring lines, and reduce space requirements. The desirability of reducing total signal lines to a minimum is especially important when logic circuits are constructed either in integrated or in semi-integrated form; otherwise, the saving in space requirements achieved by integration is not fully realized.

One method suggested in the prior art for reduced total signal line is to use tapped output lines. According to this method, an output line is provided for a logic circuit, and many or all circuits to be driven from that logic circuit have an input tapped from the single output line. This requires that the driven circuits have very high input impedances and that the line be terminated in its characteristic impedance in order to prevent harmful reflections. The requirement of a very high input impedance imposes an additional restriction on the type of circuit which may be used.

It is another object of the present invention to provide improved logic circuit arrangements in which the total interconnecting signal line is reduced without introducing harmful reflections and without requiring that the logic circuits have very high input impedances.

The logic circuit according to the invention includes a transistor connected in the common emitter configuration, and having one or more output logic diodes connected at the collector electrode and poled in a direction to pass collector current, when the collector-base diode is reverse biased, in the diode forward current direction. At least one level shift diode is connected between the base electrode and an input node. This level shift diode is poled to pass, in the forward direction, base to emitter current. The level shift diode has a sharp conduction threshold, whereby the node voltage is essentially clamped at a first value $V_1$ when the transistor is in saturation. The voltage at the output electrode of a logic diode has a second value $V_2$ when the transistor is in saturation. The level shift diode also has a high diffusion capacitance, whereby it can supply large reverse base current for fast turn-off of the transistor. A current source is connected at the node, and a resistor is connected between the emitter and base electrodes for assuring proper level shift operation. Input signals may be applied by way of signal lines connected between the node and the output diodes of other, similar logic circuits.

According to one feature of the invention, the current source supplies a maximum line current $$I \simeq \frac{V_1 - V_2}{Zo(\max)}$$

where $Zo(\max)$ is the characteristic impedance of the highest impedance signal line. By this means, the signal swing at the input node is limited to a value just sufficient to turn-on the transistor. By so limiting the signal swing, the amplitude of any reflections is limited to a safe value insufficient to false trigger the circuit. Due to the losses in the coupling between neighboring lines, noise induced on neighboring lines is insufficient in amplitude to trigger circuits connected to those lines.

According to another feature of the invention, the output logic diodes of a circuit may be fabricated on the same chip of semiconductive material as the transistor, with one like electrode of each diode integral with the collector electrode. Alternatively, the output diodes may be fabricated on a separate chip, and a single lead connected between the collector electrode and the input electrodes of the diodes. In the latter case, the connecting lead is chosen to be short enough so that the time constant of reflections in the connecting lead is shorter than the output signal transition time.

According to still another feature of the invention, the total signal line requirement is reduced by employing tapped input lines, wherein output diodes of several driver stages are tapped to a common input signal line of a driven circuit.

In the accompanying drawing, like reference characters denote like components, and:

Figure 1:
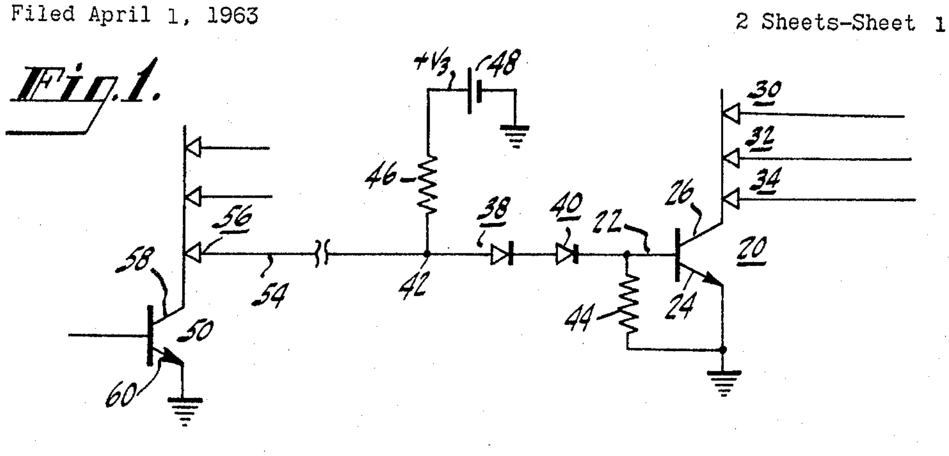
FIGURE 1 is a schematic diagram of a logic circuit according to the invention.

The circuit arrangement of FIGURE 1 includes a transistor 20, which preferably is a high speed transistor such as silicon epitaxial, connected in the grounded emitter configuration and having a base 22, an emitter 24 and a collector 26. Transistor 20 is illustrated as being of the NPN type, although PNP type transistors may be used. Three output logic diodes 30, 32, 34 are provided, and each has its cathode connected to the collector 26 in a manner to be discussed more fully hereinafter. A number of level shift diodes 38, 40, two shown, are connected in series between an input node 42 and the base electrode 22, and poled to conduct forward base current in the easy current flow direction of the level shift diodes. Level shift action is enhanced by a resistor 44 connected directly between the base 22 and emitter 24 electrodes. Bias means in the form of a current source is connected between the input node 42 and circuit ground and comprises the series combination of a resistor 46, having a resistance R, and a battery 48 having a value $+V_3$ volts.

Input signals for switching the transistor 20 on and off are applied at the node 42 by way of a signal line 54. Switch means in the form of the series combination of a diode 56 and the collector 58-emitter 60 path of a driver transistor 50 is connected between the input end of the signal line 54 and circuit ground. Driver transistor 50 may be the counterpart of the transistor 20 in the driver circuit, and diode 56 may be one of the output diodes corresponding in function to any of the diodes 30, 32, 34. These diodes 30, 32 and 34, and diode 56 are poled so that their forward direction of current carries the collector-emitter current of the transistor to the collector of which they are connected when the transistor is biased in its usual operative condition. Thus, the collector-base diode of transistor 50 is reverse poled to the diode 56, and diodes 30, 32 and 34 are reverse poled with respect to the collector-base diode of transistor 20. The input circuitry (not shown) of the driver transistor 50 may be similar to the input circuitry of the driven transistor 20. When the driver transistor 50 is in saturation, the voltage at the anode of diode 56 is $+V_2$ volts and the signal line 54 is charged to this value. The voltage $+V_2$ represents the voltage drop across the diode 56 and the collector 58-emitter 60 saturation voltage, and may be about one volt.

Figure 2:
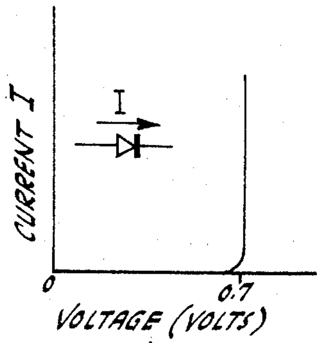
FIGURE 2 is a somewhat idealized volt-ampere characteristic of a level shift diode.

The level shift diodes 38, 40, which may be a type of Stabistor diode, are characterized by a sharp conduction threshold and a fairly constant voltage drop when the threshold is exceeded. A somewhat idealized volt-ampere characteristic 62 of a desirable level shift diode is illustrated in FIGURE 2. Each diode may have a voltage drop of about 0.7 volt when its threshold is exceeded, assuming a silicon diode. Each level shift diode also has a high diffusion capacitance that varies as a function of diode current. Preferably the total capacitance of the level shift diodes is of such magnitude when transistor 20 is saturated that the diodes 38, 40 store more charge than the charge stored in the base region of the transistor 20. Under these conditions, the level shift diodes can supply a large reverse base current which is sufficient to bring the transistor 20 out of saturation and turn the transistor off rapidly and cleanly when the input signal conditions are changed.

Battery 48, which is the only source of bias required in the circuit, has a polarity and magnitude to bias transistor 20 into saturation when the driver transistor 50 is biased off. The conduction thresholds of level shift diodes 38, 40 then are exceeded and these diodes function to clamp the voltage at the input node 42 at a value $+V_1$ volts, where $V_1$ is greater than $V_2$. The value $V_1$ is the sum of the voltage drops across the level shift diodes 38, 40 and the emitter-base junction of the saturated transistor, and may be about 2.2 volts when the diodes 38, 40 and transistor 20 are silicon. Thus, it may be seen that the voltage at input node 42 is about 2.2 volts when the driver transistor 50 is off and is about one volt when the driver transistor is in saturation, the total signal swing at the node being limited to about 1.2 volts by the clamping action of the level shift diodes 38, 40. Transistor 20 may start to turn-on when the node voltage reaches +2 volts. The voltage at the anodes of the output diodes 30, 32, 34 is about +1 volt when transistor 20 is saturated.

The inherently sharp turn-on and turn-off of a high speed transistor rendors such a device highly sensitive to noise. Noise immunity is provided in the FIGURE 1 circuit arrangement as follows. Consider first the condition in which driver transistor 50 is biased off and transistor 20 is in saturation. Minority charge carrier storage in a small geometry, gold-doped, silicon epitaxial transistor is relatively insensitive to the depth of transistor saturation. That is to say, the turn-off time of the transisor 20 is about the same whether the transistor is in ligh saturation or deep saturation. A definite advantage is obtained by operating the transistor 20 in deep saturation in that both the current supplied to the node 42 from battery 48 and the transistor base charge must be absorbed by noise pulses in order for the noise pulses to turn off the transistor. The diffusion capacity of the level shift diodes 38, 40 allows short period reverse base currents to flow without changing the voltage at the node 42. This reverse base current, as well as the base drive current in excess of that required to keep the transistor 20 on in light saturation may be supplied to charge the line 54 in response to noise spikes of short duration coupled to the line and having an amplitude and polarity tending to turn off the transistor, without any adverse effect on the transistor operation. In a circuit where the level shift means is a resistor or other fixed impedance element, less current is available to swamp noise signals, and the signal voltage and/or current swings at the node are greater for practical values of R and $V_3$.

When the driver transistor 50 is in saturation, the node voltage is $+V_2 \approx 1$ volt. This voltage is less than the combined threshold voltages of the level shift diodes 38, 40 and the minimum base 22 voltage required to turn on driven transistor 20, whereby the driven transistor 20 is biased off and most of the current supplied by battery 48 is shunted to the driver transistor 50 via the signal line 54. The resistance of resistor 44 is lower than the impedance across the emitter 24-base 22 junction when transistor 20 is off. Since this resistor 44 is in series with the level shift diodes 38, 40 between the node 42 and ground, the node voltage appears primarily across the level shift diodes and not across the emitter-base junction. The voltage developed across the resistor 44 is insufficient to turn on the transistor 20 until the node voltage rises to about +2 volts. Resistor 44 also provides a path for $I_{co}$ leakage currents.

Since current through the level shift diodes 38, 40 is a minimum, essentially zero, when driven transistor 20 is biased off, and since the diffusion capacitance of these diodes is a function of current, the capacitance has a very low value when driver transistor 50 is in saturation. Accordingly, positive noise spikes and signal transients on the line 54 are not capacitively coupled to the base 22 through the diodes 38, 40, and the driven transistor 20 remains off unless the positive noise spikes have an amplitude sufficient to raise the node voltage to about +2 volts. Thus, about one volt of immunity is provided for positive noise spikes. The usual type of parallel RC network used for level shift in prior art circuits does not have this capability because the capacitance is fixed in value and usually must be made large enough in value to provide fast switching of the transistor 20 under worst case temperature conditions. When an RC network is employed, noise spikes are capacitively coupled directly to the base 22. For like reasons, zener diodes and similar type devices do not provide this noise immunity because their capacitance is more or less fixed in value.

In the special case where the level shift diodes 38, 40 store more charge than is stored in the base of driven transistor 20, some charge remains on the diodes 38, 40 after the transistor 20 turns off and until the charge is removed by recombination and by discharge through resistor 44. During this period, there is capacitance across the diodes 38, 40. However, the base 22 voltage is negative relative to ground, in this case because the voltage across the level shift diodes 38, 40 remains approximately at the threshold value until the remaining charge is removed. It is necessary to raise the base 22 voltage about one volt during this period in order to turn on the driven transistor 20. Thus, the one volt of positive noise immunity is preserved, but the noise immunity in this case does not depend upon low capacitance across the diodes 38, 40.

The most serious problems introduced by the use of high speed transistors occur when the input is switched from one signal condition to the other, and are due to the high speed turn-on and turn-off of the transistor. The sharp leading and lagging edges of the transistor output signal contain very high frequency components, whereby the signal lines between stages may not be neglected but must be considered in terms of distributed inductance and capacitance which approximate transmission lines. Reflections occur when a signal line is not terminated properly. Moreover, ringing or oscillation occurs when one end of a line is terminated by an impedance which is greater than the characteristic impedance of the line and the other end of the line is terminated by an impedance which is lower than the characteristic impedance. Ringing is a type of reflection condition in which the voltage at a point on the line, the output end or node for example, swings positive and negative alternately.

If the amplitude of oscillations or ringing is large enough, the driven transistor at the output end of the line may be triggered on and off alternately, with resulting false triggering of circuits driven by the driven transistor. In many prior art logic circuits, a resistor is connected at the collector of the driver transistor and is selected in value so as to be able to supply sufficient current to charge all connected signal lines in the worst case condition. This generally means large signal swings at the collector, larger than required to drive any driven circuit, with resulting large amplitude reflections. Moreover, the impedance at the input of a line goes very low when the driver turns on, while the impedance at the output end of the line is relatively high, at least initially, thus producing large amplitude ringing.

There is capacitance between neighboring signal lines which results in cross-talk. There is also magnetic coupling between neighboring lines. When a signal travels down a line, therefore, a signal is coupled to the neighboring lines. If the reflections are of large amplitude, signals induced on neighboring lines may trigger the circuits connected to those lines. If there is ringing present on a line, circuits connected to neighboring lines may be triggered on and off alternately.

The manner in which ringing is prevented and reflections held to a harmless amplitude in the FIGURE 1 circuit may be better appreciated by considering a few examples of the conditions which give rise to ringing and reflections. Consider first that driver transistor 50 is saturated. Signal line 54 is charged to $+V_2$ volts and driven transistor 20 is biased off. Level shift diodes 38, 40 then present a very high impedance to the line. The resistance R of resistor 46 is much greater than $Z_0$, the characteristic impedance of the line 54. A current I flows through the line 54 from battery 48 to driver transistor 50, where $$I=\frac{V_3-V_2}{R}$$

If now driver transistor 50 is suddenly turned off, the input end of line 54 becomes open-circuited, and the voltage at the input end of the line rises abruptly to a value $V_a=V_2+IZ_0$. A positive wavefront having an amplitude $IZ_0$ propagates down the line 54 toward the node 42 and the line 54 charges to this value. Three conditions are possible, depending upon whether the node impedance is higher than, lower than or equal to $Z_0$. The node impedance in the FIGURE 1 circuit depends, in turn, upon the signal amplitude $IZ_0$.

Consider first that the initial voltage rise $IZ_0$ has an amplitude less than one volt. The propagated voltage reaching the node 42 is insufficient in amplitude to exceed the thresholds of the level shift diodes 38, 40 and turn on the transistor 20. Accordingly, the impedance at the node is much higher than $Z_0$, and a positive going voltage is reflected back toward the input end of the line. The input end of the line also has a high impedance (open circuit) and another positive going voltage is reflected from the input end of the line 54 toward the node. After a number of reflections, depending upon the initial signal value $IZ_0$, the line 54 becomes charged to two volts and driven transistor 20 turns on, clamping the voltage at the node 42. The result of the initial low amplitude voltage signal is to delay the turn-on of driven transistor 20. However, because the amplitude of the individual reflections is lower than the signal swing required for transistor turn-on, signals coupled to neighboring lines are insufficient in amplitude to turn on the driven transistors connected to those lines.

Consider now the second possible condition wherein the initial voltage rise $IZ_0$ is much greater than one volt. When this voltage propagates to the node 42, driver transistor 20 is driven to saturation and level shift diodes 38, 40 clamp the voltage at the node 42 at about 2.2 volts. Since this voltage is less than $V_2+IZ_0$, the line sees an impedance which is less than $Z_0$, and a negative going voltage is reflected from the node 42 to the input end of the line 54. This reflected voltage "sees" a very high impedance at the input end of the line, and a negative voltage is reflected back toward the node 42. If this latter voltage is large enough, driven transistor 20 may be turned off, resulting in false triggering of transistor 20 and any circuits driven by this transistor. These positive and negative voltage excursions continue with diminishing amplitude, due to the losses in the line, until the node voltage stabilizes at about 2.2 volts. Because the amplitudes of the first few reflections may be greater than the normal signal swing at a node 42, signals coupled to neighboring lines may be large enough to false trigger the driven transistors connected to the adjacent lines. This second condition, therefore, is highly undesirable and is to be avoided.

Consider now the third condition where the initial signal voltage $IZ_0$ has an amplitude of approximately 1 to 1.2 volts. This propagated voltage, upon reaching the node 42, turns on the driven transistor 20 and the level shift diodes 38, 40 clamp the node voltage at about 2 to 2.2 volts. This voltage is equal, or equal approximately, to $V_2+IZ_0$. If the driven transistor 20 is able to absorb the current previously supplied to the line 54, the line appears to be terminated in its characteristic impedance and there is then no ringing or reflections.

This desirable condition is realized by selecting the values of R and $V_3$ so that the bias means functions as a current source, and the signal voltage $IZ_0$ is equal approximately to $V_1-V_2$. That is to say, the voltage at the input end of the line 54 rises to a value $V_2+IZ_0=V_1$, when driver transistor 50 turns off, where $V_1$ is the clamp voltage at the node 42 due to the action of the level shift diodes 38, 40. The relationship between the various voltages and bias resistor for the no-reflection, no-ringing condition is as follows:

$$I_{\text{Line}}=\frac{V_1-V_2}{Z_0}=\frac{V_3-V_2}{R}$$

Actually, the voltage at the node 42 can vary over a small range depending upon the level of conduction of driven transistor 20. Also, the level shift diodes 38, 40 can pass different amounts of current for the same voltage drop. The transistor 20 and diodes 38, 40 are thus able to adjust to different transient signal voltage conditions over a small range, whereby the value $IZ_0$ can vary over a small range without giving rise to any reflections at the node. It is thus seen that the output end of the signal line 54 has a virtual termination equal to the characteristic impedance, although the line actually is not so terminated physically.

By way of example only, and assuming a characteristic impedance of 200 ohms, the resistor 46 may have a value of 1000 ohms and $V_3$ may be 6 volts. This gives rise to a nominal line current of five milliamperes. When driver transistor 50 turns off, the voltage rise $IZ_0$ equals one volt and the line charges to two volts as the initial voltage rise propagates to the node 42. A voltage of two volts at the node 42 is sufficient to turn on the driver transistor 20.

The use of high speed transistors also introduces the possibility of high amplitude reflections and ringing when a transistor is turned on. The manner in which ringing is prevented and reflections are held to safe values in the FIGURE 1 circuit will now be discussed. Assume that driven transistor 50 is biased off and driven transistor 20 is in saturation. Level shift diodes 38, 40 present a low impedance and clamp the node 42 voltage at $+V_1\approx+2.2$ volts. Signal line 54 is charged to this value.

The reflection sequences that occur when driver transistor 50 turns on are quite complex, and only the major operational modes will be discussed. When driver transistor 50 turns on, the voltage at the input end of the line 54 drops to $+V_2$ volts. Actually, the initial voltage appearing at the input of the signal line 54 may be somewhat lower than $+V_2$ volts due to the lower voltage at the collector 58 being capacitively coupled to the line 54 through the output diode 56. The negative going voltage bump propagates to the input node 42 with a signal current that depends upon the characteristic line impedance $Z_0$. When this voltage bump reaches the node 42, driven transistor 20 turns off rapidly due to the high diffusion capacitance of the level shift diodes 38, 40. The impedance seen at the node 42, however, actually is lowered by the high reverse base current. Tests indicate that the high base 22 charge currents minimize reflections at the node 42.

In the unusual situation when the node 42 impedance is greater than $Z_0$, a negative voltage wavefront is reflected back toward the input end of the line 54. This negative voltage reverse biases the output diode 56, whereby a high impedance appears at each end of the line 54 and no ringing can occur. The high back impedance of the diode 56 prevents the flow of current between the driver transistor 50 and the line 54 necessary to charge the line, and thereby aids in inhibiting the propagation of reflections. This is one important reason for locating the diode 56 at the input end of the line.

In the event that the initial propagated voltage sees a node impedence which is lower in value than $Z_0$, a positive voltage is reflected from the node 42. The diode 56 remains forward biased and a low impedence appears at the input end of the line 54. Since each end of the line 54 has a termination less than $Z_0$, there can be no ringing. The signal merely reflects back and forth with diminishing amplitude until the line is charged to $+V_2$ volts.

In summary, there can be no ringing when driver transistor 50 turns on. This is important because the turn-on time of a transistor usually is shorter than the turn-off time. Moreover, since the initial voltage change at the input end of the line 54 is equal to, or only slightly greater than, the normal signal swing at a node 42, and because there are losses in the coupling between adjacent signal lines, any reflections are of insufficient amplitude to trigger driven transistors connected to adjacent lines.

One reason for locating the output diode 56 at the collector has been discussed. The same reason applies to the output diodes 30, 32, 34. Another reason is the decreased cost when the circuit is manufactured in integrated or semi-integrated form. Preferably the cathods of the output diodes are integral with the associated collector.

Figure 3:
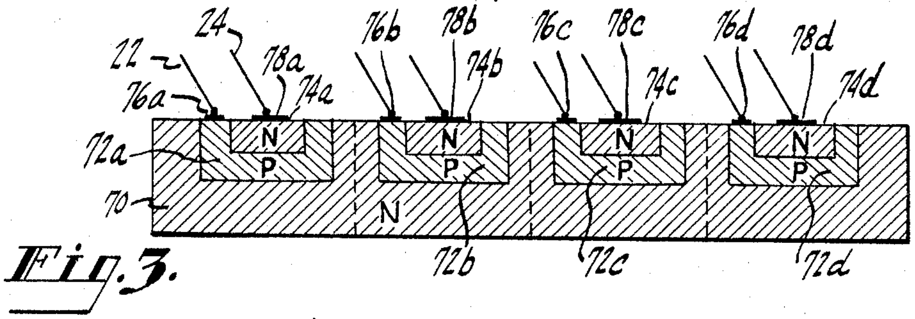
FIGURE 3 is a cross-sectional view of a transistor and a number of output diodes on a single wafer.

It is known to manufacture transistors in arrays on a single wafer, as shown in FIGURE 3. In FIGURE 3, the large area 70 is a wafer of N-type silicon material. Four P-type regions **72*a* . . . 72*d* are diffused into the wafer 70 using well-known masking techniques. Four smaller N-type regions 74*a* . . . 74*d* then are diffused into the P-type regions 72*a* . . . 72*d*, respectively, again using masking techniques. The main body 70 is a common collector region, P-type regions 72*a* . . . 72*d* are the base regions of four separate transistors, and the small N-type regions 74*a* . . . 74*d* are emitters of the four transistors. Separate metallic contacts, such as the contacts 76*a*, 78*a* are deposited on the base and emitter regions, respectively, by evaporation, and leads such as 22, 24 are joined to the metallic contacts 76*a*, 78*a***, respectively by any convenient method, such as thermal compression bonding.

When separate transistor units are desired, the structure is "diced" by cutting along the dashed lines. However, the structure in its illustrated form may be used in the FIGURE 1 circuit as follows. The unit on the left is used as the transistor 20 for example, and the remaining three units are used as output diodes 30, 32, 34. In this event, the leads connected to the metallic contacts **78*b* . . . 78*d* are not used. The leads connected to the metallic contacts 76*b* . . . 76*d* are the signal leads which connect the diodes to nodes of other logic circuits. Essentially, the diodes 30, 32, 34** comprise the base-collector junctions of transistors.

Figure 4:
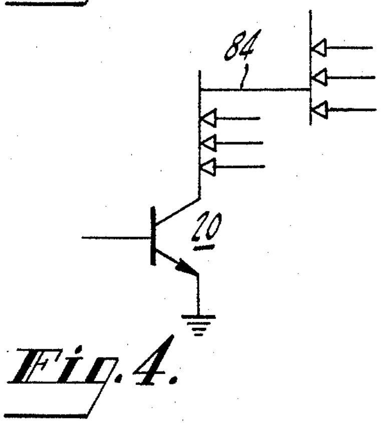
FIGURE 4 is a schematic diagram illustrating one manner in which additional output diodes may be connected to the transistor.

Although only three diodes are shown in FIGURES 1 and 3, it will be apparent that more diodes could be provided. However, in the interest of economy, the FIGURE 3 structure may be manufactured with a number of diodes determined by the average number of diodes required by the various logic circuits in the system. It is assumed for discussion purposes that the average number of outputs connected to a transistor is three. In some instances, more than three diodes will be required and, in that event, the collector regions of two structures may be joined directly, or by a lead 84, as shown schematically in FIGURE 4. The length of the lead 84 is chosen to have a certain maximum length, to be described.

Figure 5:
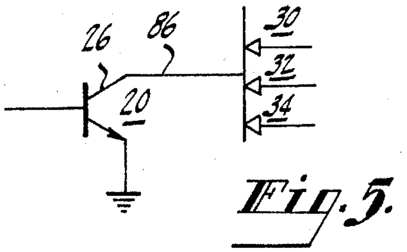
FIGURE 5 is a schematic diagram illustrating an alternative manner in which output diodes may be connected to the transistor.

The ouput diodes 30, 32, 34 also may be a self-contained unit separated from the transistor 20, and have their cathode electrodes in common as illustrated in FIGURE 5. A lead 86 connects the common cathodes to the collector 26 of the transistor 20. Again, the lead 86 is chosen to have a certain maximum length to be described. It should be understood that the above description of the method of manufacturing and/or arranging the driven transistor 20 and output diodes 30, 32, 34 applies also to the driven transistor 50 and its associated output diodes.

Figure 6:
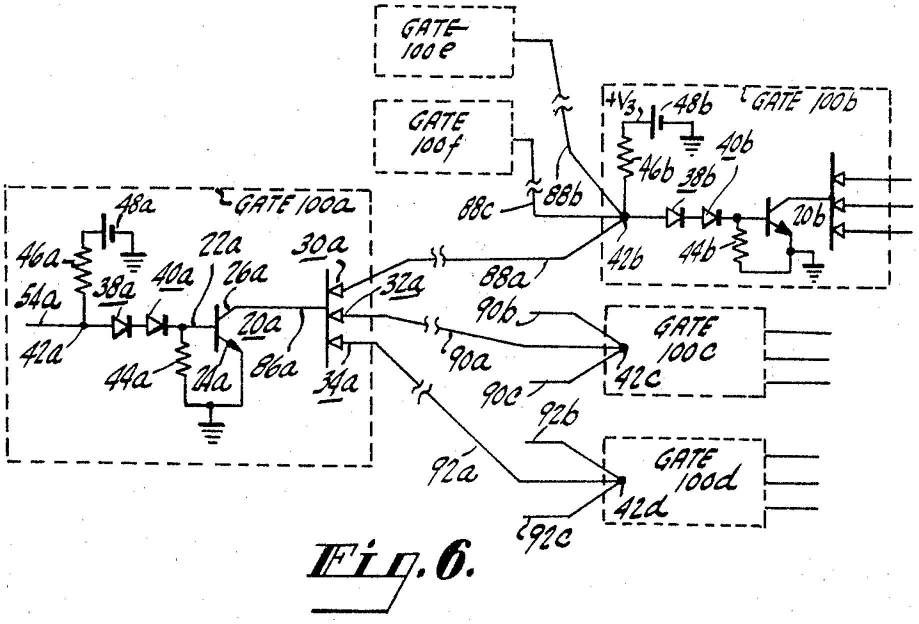
FIGURE 6 is a diagram, partly in schematic and partly in block form, of a logic arrangement illustrating certain features of the invention.

FIGURE 6 is a logic arrangement, partly in schematic and partly in block form, illustrating one manner in which different logic circuits may be arranged. The circuitry of gate 100*a* is the same structurally as that portion of the FIGURE 1 circuit comprising transistor 20 and related components, except that the cathodes of the ouput diodes 30, 32, 34 are connected to the collector 26 by way of a lead 86*a*. Gate 100*b* is the same, and it is assumed that the circuitry (not shown) of each of the other gates 100*c* . . . 100*f* is the same as that of gates 100*a* and 100*b*.

The anodes of output diodes 30*a*, 32*a* and 34*a* are connected by way of signal lines 88*a*, 90*a* and 92*a* to the input nodes 42*b*, 42*c* and 42*d* of the gates 100*b*, 100*c* and 100*d*. Each of the latter gates also has a number of other input lines, two shown by way of example, connected at its input node. For example, gate 100*b* has additional input signal lines 88*b* and 88*c* connected between its input node 42*b* and an output diode of each of the gates 100*e*, 100*f*, respectively. The gates connected at the input ends of the remaining signal lines 90*b*, 90*c*, 92*b* and 92*c* are omitted for clarity of drawing.

Let it be assumed for the present that all signal lines have the same characteristic impedance $Z_0$. The bias means in each of the logic gates 100*a* . . . 100*e* then is selected to supply a current $$I=\frac{V_1-V_2}{Z_0}$$

to its associated node when the node voltage is $V_2$. If now the transistor 20*a* in gate 100*a* is saturated and the transistors in gates 100*e*, 100*f* and the gates connected at the input ends of lines 90*b*, 90*c*, 90*b* and 92*c* are turned off, a current I flows in each of the lines 88*a*, 90*a* and 92*a* to the transistor 20*a*. The lead 86*a* at the collector 26*a* of transistor 20*a* carries a current 3I, whereby there is a mismatch in the current in lead 86*a* as compared to the signal lines 88*a*, 90*a*, 92*a*.

When transistor 20*a* turns off, the output diodes 30*a*, 32*a*, 34*a* become reverse biased, and there is a very high impedance at both ends of the lead 86*a*. If this lead 86*a* is long, the lead 86*a* could charge up to a high voltage, for example $3IZ_L$, where $Z_L$ is the characteristic impedance of the lead, and there may be large reflections in the lead, giving rise to large noise spikes. Further, turn-on of transistor 20*a* would be slowed down since the capacitance of the lead 86*a* would have to be discharged over a larger voltage swing. Also, when transistor 20*a* turns on there must be a sufficient number of reflections in the lead 86*a* to allow the lead current to adjust to the currents in the signal lines.

These problems are avoided or at least minimized by making the lead 86*a* short enough so that the time constant of reflections in the lead 86*a* is shorter than the output signal transition time, that is to say, shorter than the turn-on and turn-off times of the transistor. This allows the voltage and current conditions of the lead 86*a* to make the necessary adjustment during the signal transient. Of course, this problem is eliminated entirely when the cathodes of the diodes 30*a*, 32*a*, 34*a* are integral with the collector 26*a*, as in FIG. 1.

Connecting the logic diodes at the collector of a transistor rather than at the output end of a signal line has the further advantage of minimizing the effects of cross-talk. Consider the diodes 30*a*, 32*a* and 34*a* in gate 100*a*. If a large noise signal is induced on signal line 88*a*, for example, only the transistor 20*b* in gate 100*b* can be triggered. The diodes 30*a* and 32*a* are connected back-to-back, as are the diodes 30*a* and 34*a*, whereby the disturbance on line 88*a* is not felt on lines 90*a* and 92*a*. If, on the other hand, the diodes 30, 32*a*, 34*a* were connected at the nodes 42*b*, 42*c*, 42*d*, respectively, any disturbance on line 88*a* is not felt on lines 90*a* and 92*a*. lines 90*a* and 92*a* when the transistor 20*a* is biased off.

The transistor 20*b* of gate 100*b* is on in saturation when the driver transistors in gates 100*a*, 100*e* and 100*f* are biased off. Each signal line 88*a*, 88*b*, 88*c* connected to the node 42*b* is charged to the node clamp voltage $+V_1$. Transistor 20*b* turns off whenever any one or more of the drivers in gates 100*a*, 100*e*, 100*f*, 100*c* turns on. The diode 30*a* and the diodes (not shown) at the input ends of the signal lines 88*b*, 88*c* operate as a logic gate performing the OR function and the transistor provides inversion. Thus, it is seen that the gate 100*b* performs the logical NOR function. Each of the other gates performs similarly.

Given the condition where all of the transistors in the gates 100*a*, 100*e* and 100*f* are on in saturation at the same time, the current I supplied at the node 42*b* divides among the signal lines 88*a*, 88*b*, 88*c* and each may carry a current I/3. The node 42*b* voltage is $+V_2$. Whenever any one of the driver transistors turns off, the voltage at the input of the connected line rises a maximum amount $$\frac{IZ_0}{3}$$

This voltage rise is not enough to turn on the transistor 20*b* and, after a few reflections the current I/3 previously carried by the line is taken up by the other lines. When all of the transistors in the gates 100*a*, 100*e*, 100*f* turn off together, there is a voltage rise of $$\frac{IZ_0}{3}$$

at the input end of the lines 88*a*, 88*b*, 88*c*. These positive wavefronts travel down toward the node 42*b* and see a high impedance, whereby positive going voltages are reflected back toward the input ends of the line. After a number of reflections the lines charge up to a voltage sufficient to turn on the output transistor 20*b*.

In actual practice, the characteristic impedances of all signal lines is not the same. The characteristic impedance is dependent, in part, on the proximity of a line to ground planes and neighboring lines. In the FIGURE 6 arrangement, ringing is prevented by selecting the parameters of the various bias means, resistor 46*b* and $+V_3$ for example, so that the maximum current supplied to a node is $$\frac{V_1-V_2}{Z_{0\,\max.}}$$

where $Z_{0\,\max}$ is the characteristic impedance of the highest impedance line connected at the node.

Figure 7:
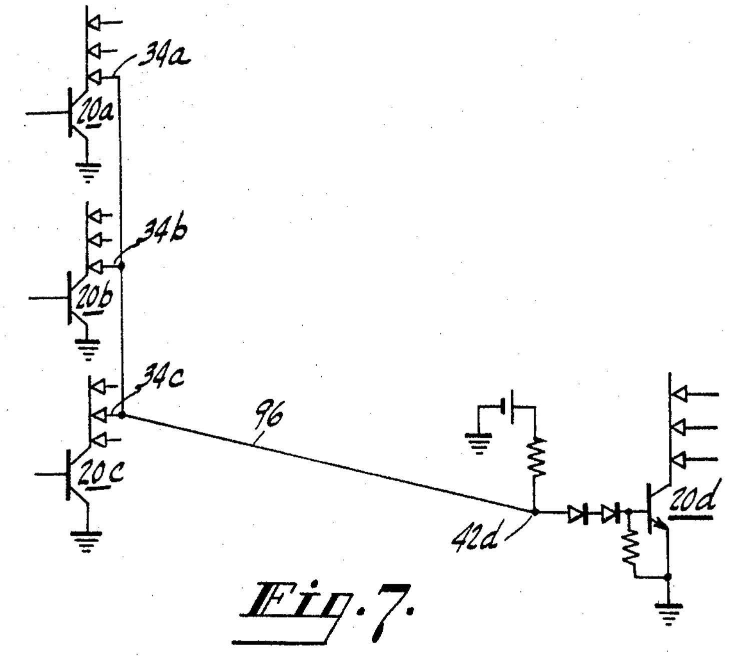
FIGURE 7 is a schematic diagram of a logic arrangement illustrating the use of a tapped input line.

It is desirable to reduce the number and length of signal lines as much as possible in order to reduce the effect on the characteristic impedance of a line by closeness of adjacent lines, and also to minimize coupling, cross-talk and space requirements. These desired ends are accomplished by employing tapped input lines, as illustrated in FIGURE 7. Rather than connecting each of the diodes 34*a*, 34*b* and 34*c* to the input node 42*d* by way of a separate signal line, as in FIGURE 6, a single input line 96 is employed. The output end of the line 96 is connected at the node 42*d*, and the anodes of output diodes 34*a*, 34*b* and 34*c* are tapped onto the signal line 96. Since no portion of the line 96 carries a current $$I>\frac{V_1-V_2}{Z_0}$$

there can be no ringing for reasons discussed in connection with the description of the FIGURE 1 circuit.

What is claimed is:

1. The combination comprising:

a transistor connected in the common emitter configuration and having a base electrode and a collector electrode;

at least one level shift diode connected between an input node and said base electrode, said diode functioning to clamp the voltage at said node at a value $V_1$ when the emitter-base junction of said transistor is biased in the low impedance condition;

a resistor connected between the base and emitter electrodes;

a signal line connected at its output end to said node and having a finite characteristic impedance $Z_0$;

switch means connected at the input end of said line and being operable in a first condition to open-circuit the input end of the line and being operable in a second condition to present an impedance which results in a voltage of $V_2$ volts at the input end of the line;

bias means connected between said node and the emitter for normally biasing the emitter-base junction in the low impedance condition, said bias means supplying a current $$I \cong \frac{V_1 - V_2}{Z_0}$$

at said input node when the switch means is in the second operating condition; and output means connected at said collector electrode.

2. The combination comprising:

a transistor connected in the common emitter configuration and having a base electrode and a collector electrode;

at least one level shift diode connected between an input node and the base electrode;

a resistor connected between the base and emitter electrodes;

an input signal line connected at its output end to said node and having a finite characteristic impedance $Z_0$;

switch means connected at the input end of said line and being selectively operable to switch the input end of said line between an open-circuit condition and a condition of $V_2$ volts;

a curent source connected between said node and said emitter for normally biasing said transistor into saturation, said current source supplying a current $$I \cong \frac{V_1 - V_2}{Z_0}$$

at said node when the voltage at the input end of said line is $V_2$, said level shift diode clamping the voltage at said node at $V_1$ volts when said transistor is in saturation; and output means connected at the collector electrode.

3. The combination comprising a driven transistor and a driver transistor of the same conductivity type, each having an emitter connected to a point of reference potential, a collector and a base;

an output diode having one electrode connected to the collector electrode of the driver transistor and being poled to pass collector current in the low resistance direction of the output diode;

an input node for the driven transistor;

at least one level shift diode connected between the input node and the base of said driven transistor, said level shift diode having a conduction threshold and a substantially constant voltage drop when the threshold is exceeded for clamping the voltage at the node at a value $V_1$ when the driven transistor is in saturation, said level shift diode also having a diffusion capacitance that varies as a function of current;

a signal line connected between said node and the other electrode of said output diode and having a finite characteristic impedance $Z_0$, the voltage at said other electrode having a value $|V_2|+|V_1|$ when the driver transistor is saturated;

bias means connected between said node and said point of reference potential for biasing the driven transistor into saturation when the driver transistor is in the cut-off condition and for supplying a current $$I \cong \frac{V_1 - V_2}{Z_0}$$

at said node when the driver transistor is saturated;

means for applying input signals between the base and emitter of the driver transistor for selectively switching the driver transistor between cut-off and saturation; and output means connected at the collector of the driven transistor.

4. The combination as claimed in claim 3 including other, like transistor driver circuits each having an output diode connected to said signal line.

5. The combination as claimed in claim 3 including other, like driver transistors each having an output diode; and signal lines connected between the last-mentioned output diodes and the input node of said driven transistor, each of said signal lines having a finite characteristic impedance which does not exceed $Z_0$.

6. The combination as claimed in claim 3, wherein said one electrode of said output diode is integral with the collector of said driver transistor.

7. The combination as claimed in claim 3, wherein said one electrode of said output diode is connected by a lead to the collector of said driver transistor, said lead being short enough so that the time constant of the reflections in said lead is shorter than the transistion time of the signal output of said driver transistor.

8. The combination comprising a transistor connected in the common emitter configuration and having a base and a collector;

an input node;

at least one level shift diode connected between the input node and the base and having a diffusion capacitance that varies as a function of diode current, said diode also having an operating region of substantially constant voltage for clamping the voltage at said node at a value $V_1$ volts when the transistor is in saturation;

bias means connected between said node and the emitter for normally biasing the transistor into saturation, said bias means including the series combination of a resistor having a value R and a voltage source of $V_3$ volts;

a signal line connected at its output end to said node and having a finite characteristic impedance $Z_0$;

a diode and switch means serially connected between the input end of the signal line and the emitter, the voltage at the input end of the line having a value $|V_2| \neq |V_1|$ when the switch means is closed to complete the path between said input end of said line and said emitter;

the values R and $V_3$ being selected so that $$\frac{V_3 - V_2}{R} \cong \frac{V_1 - V_2}{Z_0}$$

and output means connected to the collector electrode.

9. The combination comprising:

a first logic circuit including a transistor connected in the grounded emitter configuration and having a base and a collector; an input node; at least one level shift diode connected between the input node and the base and having a diffusion capacitance that varies as a function of diode current, said diode also having an operating region of substantially constant voltage;

bias means connected between said node and circuit ground for normally biasing said transistor into saturation, said diode clamping the voltage at said node at $V_1$ volts when said transistor is in saturation; and at least one output diode having one electrode connected at the collector and being poled to pass collector current, the voltage at the other electrode of said output diode having a valve $|V_2| \neq |V_1|$ when said transistor is in saturation;

a number of other logic circuits like said first logic circuit;

signal lines connected between the node of said first logic circuit and one output diode of each of said other logic circuits, the characteristic impedance of the highest impedance line having a finite value $Z_0$; and the bias means of said first logic circuit supplying a current $$I \cong \frac{V_1 - V_2}{Z_0}$$

at the associated input node when the voltage at the input end of any of said lines has the value $V_2$ volts.

10. The combination comprising:

a first logic circuit including a transistor connected in the common emitter configuration and having a base and a collector; a resistor directly connected between the base and emitter; an input node; at least one level shaft diode connected between the input node and the base electrode and having a diffusion capacitance that varies as a function of diode current, said diode also having an operating region of substantially constant voltage; bias means connected between said node and the emitter for normally biasing the transistor into saturation, said level shift diode clamping the voltage at said node at $V_1$ volts when the transistor is in saturation; and at least one output diode having one electrode connected at the collector and being poled to pass collector current, the voltage at the other electrode of said output diode having a value $V_2$ when the transistor is in saturation, where $|V_1| \neq |V_2|$;

a number of other logic circuits like said first logic circuit;

a signal line connected at its output end to the node of said first logic circuit and having taps connected to an output diode of each of the other logic circuits, said signal line having a finite characteristic impedance $Z_0$; and the bias means of said first logic circuit supplying a current $$I \cong \frac{V_1 - V_2}{Z_0}$$

at its associated input node when the transistor in any of said other logic circuits is in saturation.

11. The combination comprising:

a first logic circuit including a transistor connected in the grounded emitter configuration and having a base and a collector; an input node; at least one level shift diode connected between the input node and the base and having a diffusion capacitance that varies as a function of diode current, said diode also having an operating region of substantially constant voltage; bias means connected between said node and circuit ground for normally biasing the transistor into saturation, said level shift diode clamping the voltage at said node at $V_1$ volts when the transistor is in saturation; and a number of output diodes each having one electrode integral with said collector and being poled to pass collector current, the voltage at the other electrode of each of said output diodes having a value $|V_2| \neq |V_1|$ when the transistor is in saturation;

a signal line having its output end connected at said input node and having a finite characteristic impedance $Z_0$;

a plurality of switch means each being connected to a different tap along the length of said signal line and each being selectively operable between an open condition and a closed condition in which a voltage of $V_2$ volts is applied at the respective tap; and said bias means supplying a current $$I \cong \frac{V_1 - V_2}{Z_0}$$

to said signal line when any of said input switches is in the closed condition.

12. The combination as claimed in claim 11 including a resistor directly connected between the emitter and base of said transistor.

13. The combination comprising:

a first logic circuit including a transistor connected in the grounded emitter configuration and having a base and a collector; an input node; at least one level shift diode connected between the input node and the base and having a diffusion capacitance that varies as a function of diode current, said diode also having an operating region of substantially constant voltage; bias means connected between said node and circuit ground for normally biasing the transistor into saturation, said level shift diode clamping the voltage at said node at $V_1$ volts when the transistor is in saturation; a number of output diodes having a like electrode connected together; and a lead connected between the collector and the like electrodes, the voltage at the other electrode of each of said output diodes having a value $V_2 \neq V_1$ when the transistor is in saturation, said lead being short enough in length so that the time constant of reflections in the lead is shorter than the transistor output signal transition time;

a number of other logic circuits like said first logic circuit; and signal lines connected between the said other diode electrodes of ones of said logic circuits and the input nodes of other ones of said logic circuits; and each said bias means supplying a current $$I \cong \frac{V_1 - V_2}{Z_0}$$

at its input node when the voltage at the input end of any of the signal lines connected thereto has a value $V_2$ volts, where $Z_0$ is the finite characteristic impedance of the highest impedance one of said connected signal lines.

14. The combination as claimed in claim 13 including a resistor directly connected between the emitter and base of the transistor in each logic circuit.

References Cited by the Examiner

UNITED STATES PATENTS

| | | | |
|---|---|---|---|
| 2,964,653 | 12/1960 | Cagle et al. | 307—88.5 |
| 3,106,644 | 10/1963 | Retzinger | 307—88.5 |
| 3,125,675 | 3/1964 | Jeeves | 307—88.5 X |
| 3,136,897 | 6/1964 | Kaufman | 307—88.5 |
| 3,140,405 | 7/1964 | Kolling | 307—88.5 |
| 3,152,263 | 10/1964 | De Fries | 307—88.5 |
| 3,197,719 | 7/1965 | Wells | 307—88.5 X |
| 3,209,214 | 9/1965 | Murphy et al. | 307—88.5 X |

OTHER REFERENCES

Shulz: "High Speed Diode Coupled Nor Gate," Solid State Design, (mag.), August 1962, pp. 52 and 53.

ARTHUR GAUSS, *Primary Examiner.*

D. D. FORRER, *Assistant Examiner.*